UNITED STATES PATENT OFFICE.

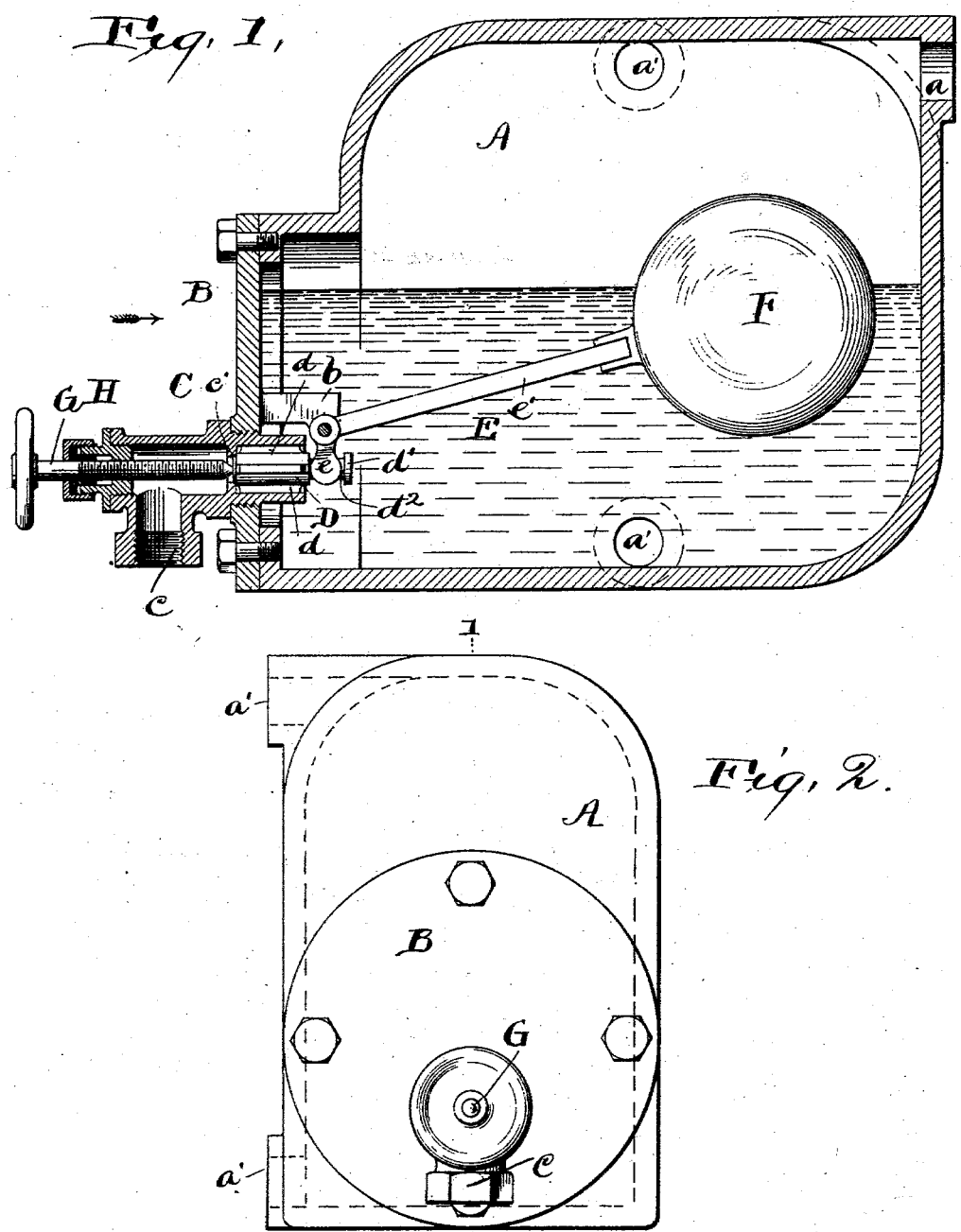

HERBERT F. COOK, OF CLEVELAND, OHIO, ASSIGNOR TO THE STANDARD GAUGE AND MANUFACTURING COMPANY, OF SAME PLACE.

STEAM-TRAP.

SPECIFICATION forming part of Letters Patent No. 633,809, dated September 26, 1899.

Application filed June 15, 1899. Serial No. 720,621. (No model.)

*To all whom it may concern:*

Be it known that I, HERBERT F. COOK, a citizen of the United States, residing at Cleveland, in the county of Cuyahoga and State of Ohio, have invented a certain new and useful Improvement in Steam-Traps, of which the following is a full, clear, and exact description, reference being had to the accompanying drawings.

The object of the invention is to provide a simple, cheap, and durable steam-trap, wherein the outlet-valve will work automatically to prevent undue accumulation of water in the trap-casing, but which may be opened positively when desired.

The invention consists in the construction and combination of parts hereinafter described, and pointed out definitely in the claim.

In the drawings, Figure 1 is a sectional side elevation on line 1 1 of Fig. 2; and Fig. 2 is an end view of the trap, looking in the direction of the arrow in Fig. 1.

Referring to the parts by letters, A represents the casing which forms the body of the trap and has an inlet-opening $a$ and two threaded tubular projections $a'$ $a'$ for connecting the water-gage. One end of the casing is closed by a plate B, which is fastened thereto by screws. A tubular plug C is screwed into a threaded outlet-opening in said plate. This tubular plug has an elbow $c$, to which an escape-pipe may be connected. This plug has an internal annular valve-seat $c'$, and it contains also a valve D for engagement with said seat. This valve is of a well-known form, having guideways $d$. Its stem $d'$ projects into the casing and has a groove $d^2$, with which the lower forked end $e$ of a bell-crank lever E engages, whereby the rocking of the lever will move the valve toward or from its seat. This lever is pivoted to ears $b$ on the inner side of plate B, and its arm $e'$ is attached to a float F. When the float is lifted by the accumulating water, the valve is drawn from its seat. As the float falls the valve is moved toward its seat.

It is frequently desirable to draw off the water in the casing, and for this purpose a screw G screws through the end cap H of the plug C (said screw being embraced by a stuffing-box $h$) and is in line with the valve. When this screw is screwed in, its end engages directly with the end of the valve and moves it from its seat.

It is not claimed that the valve is new, nor that it is new to employ a lever operated by a float to automatically operate the valve; nor is it claimed that means have not been heretofore used to positively move a float-operated valve from its seat.

The chief merit of the present invention is due to the fact that the same screw-plug which contains the valve contains also the means for positively moving the valve from its seat, that these means and the valve are of the simplest and cheapest form, and that the combination is novel, cheap, and effective.

Having described my invention, I claim—

In a steam-trap, the casing, the plate B which closes the opening through one end of the casing, and which is provided upon its inner side with the ears $b$, the bell-crank lever pivoted between said ears and provided at its upper end with the float F, and which lever is provided with the lower forked end $e$, and the valve D provided with the grooved stem $d'$, combined with the end cap H, screw-threaded near its inner end, and which cap has its inner end to project through the plate B a suitable distance just below the ears $b$, a screw G which passes through the end of the cap H, and bears against the inner end of the valve; the cap being provided with a valve-seat against which the end of the valve D fits, substantially as shown and described.

In testimony whereof I hereunto affix my signature in the presence of two witnesses.

HERBERT F. COOK.

Witnesses:
ALBERT H. BATES,
PHILIP E. KNOWLTON.